(12) United States Patent
Zhao et al.

(10) Patent No.: US 9,299,962 B2
(45) Date of Patent: Mar. 29, 2016

(54) BATTERY ENCASEMENT

(71) Applicant: MEDTRONIC, INC., Minneapolis, MN (US)

(72) Inventors: Hailiang Zhao, Maple Grove, MN (US); Steven J. May, Minnetonka, MN (US); Markus W. Reiterer, Plymouth, MN (US); Bernard F. Heller, Shoreview, MN (US)

(73) Assignee: Medtronic, Inc., Minneapolis, MN (US)

( * ) Notice: Subject to any disclaimer, the term of this patent is extended or adjusted under 35 U.S.C. 154(b) by 33 days.

(21) Appl. No.: 13/803,880

(22) Filed: Mar. 14, 2013

(65) Prior Publication Data

US 2013/0302665 A1 Nov. 14, 2013

Related U.S. Application Data

(60) Provisional application No. 61/645,871, filed on May 11, 2012.

(51) Int. Cl.
*H01M 2/02* (2006.01)
*H01M 2/04* (2006.01)

(52) U.S. Cl.
CPC ............ *H01M 2/0202* (2013.01); *H01M 2/022* (2013.01); *H01M 2/0404* (2013.01); *H01M 2/046* (2013.01); *Y10T 29/49108* (2015.01)

(58) Field of Classification Search
CPC . H01M 2/0202; H01M 2/022; H01M 2/0404; H01M 2/046
USPC .......................................... 429/163; 29/623.1
See application file for complete search history.

(56) References Cited

U.S. PATENT DOCUMENTS

| | | | |
|---|---|---|---|
| 5,103,818 A | 4/1992 | Maston et al. | |
| 5,456,698 A | 10/1995 | Byland et al. | |
| 6,498,951 B1 | 12/2002 | Larson et al. | |
| 6,746,798 B1 * | 6/2004 | Hiratsuka et al. | 429/163 |
| 8,065,006 B2 | 11/2011 | Rorvick et al. | |
| 2006/0178708 A1 | 8/2006 | Rorvick et al. | |

* cited by examiner

*Primary Examiner* — Mark F Huff
*Assistant Examiner* — Monique Wills

(57) ABSTRACT

An encasement for an electrochemical cell and method of making such encasement is discloses. The design of the encasement results in an encasement having an area of high stress located away from the weld zone area of the encasement, where the cover and the case are welded together.

9 Claims, 6 Drawing Sheets

BATTERY ENCASEMENT

FIELD

This disclosure relates to electrochemical cell encasements including covers and cases.

BACKGROUND

The following discussion discloses electrochemical cells and methods of making cells for use in an implantable medical device (IMD) that is very compact, such that IMD can be readily implanted in small spaces within the patient's anatomy. As such devices get smaller, new challenges in manufacturing of components, such as batteries present themselves. One of the challenges is making battery encasements, for example covers and cases, that can be reliably manufactured to remain sealed during use within a human body. It is known that the welding of certain metals can form areas at the weld that are more susceptible to hydrogen cracking or embrittlement than the base metals. The root of the weld is typically the weakest spot in a welded structure due to stress concentration effect.

SUMMARY

Applicants have discovered a design for an electrochemical cell encasement including a cover and a case in which the welded joints formed at the cover and case interface are created in lower stress areas of the encasement.

In one embodiment, the battery case is hollow except for one end and has a cylindrical shape and has a circular cross section.

DETAILED DESCRIPTION

"Anode" and "cathode" are used as these terms are commonly understood in reference to electrochemical cells, for example, batteries and capacitors.

The electrochemical cells described in this disclosure are useful in compact implantable medical devices (IMDs) that can be implanted within small spaces of an anatomy, such as the vasculature or an organ, for example a chamber of a heart. The same reference numbers are used in multiple figures when referring to the same element of the disclosure.

Figure 1:
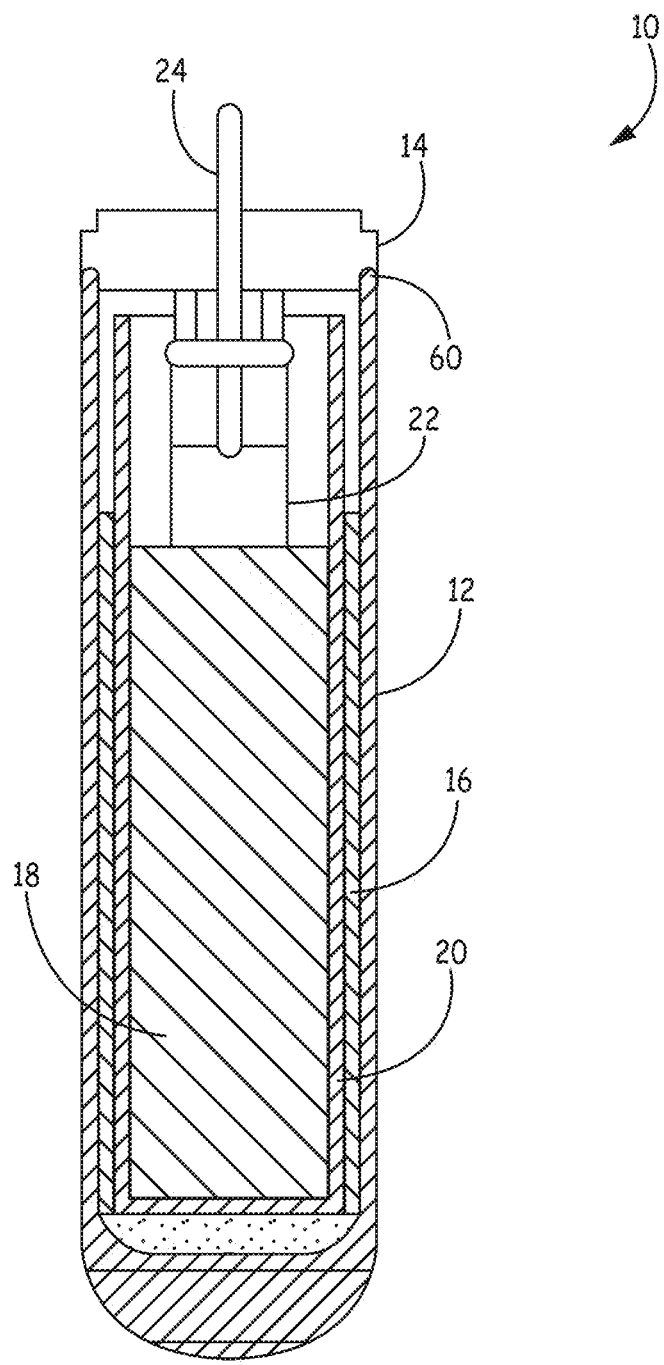
FIG. 1 is section view of a battery assembly.

Battery assembly 10 for an implantable medical device is shown in FIG. 1. In this embodiment, battery assembly 10 includes a generally cylindrical battery case 12 and corresponding battery cover 14. Battery case 12 and battery cover 14 will be discussed in greater detail below. Within battery case 12 is the anode 16, cathode 18 and separator 20. Each of the anode 16, cathode 18 and separator are generally coaxial with one another. Embedded within the cathode is current collector 22 which is connected to feedthrough pin 24. The feedthrough pin 24 can be connected to for example, an electronics assembly for an implantable medical device. The battery assembly as depicted provides that in operation, the battery case and cover have a negative potential, also known as "case negative" polarity. The outer surfaces of the battery assembly are designed to be exposed to bodily fluids when implanted. The battery case has a generally tubular shape and is generally circular in cross section. Other shapes in cross section include ovate, elliptical, or any other suitable shape. Of course the battery shape of the battery cover is designed to attach to the battery case as described in this application.

Useful battery materials include a case and cover made of an electrically conductive material such as alpha-beta and beta titanium alloys such as Ti-6Al4V or Ti-15Mo, respectively, stainless steels, titanium, for example grade 1, or any other grade, an anode of for example, lithium metal, a cathode of for example, a hybrid mixture of carbon monofluoride ($CF_x$) and silver vanadium oxide (CSVO) and may further contain carbon black or polytetrafluoroethylene (PTFE), or both and the separator 20 can include porous polypropylene film, such as that provided by Celgard, LLC of Charlotte, N.C. (e.g., CELGARD 2500, CELGARD 4560, and the like). The battery assembly also includes a liquid electrolyte (not shown) for facilitating ionic transport and forming a conductive pathway between the anode 16 and the cathode 18. The feedthrough pin and the current collector are made from an electrically conductive material such as titanium, platinum, niobium, molybdenum, alloys of titanium, stainless steel, or alloys of any of these. The feedthrough pin is normally a solid unitary component.

Figure 2:
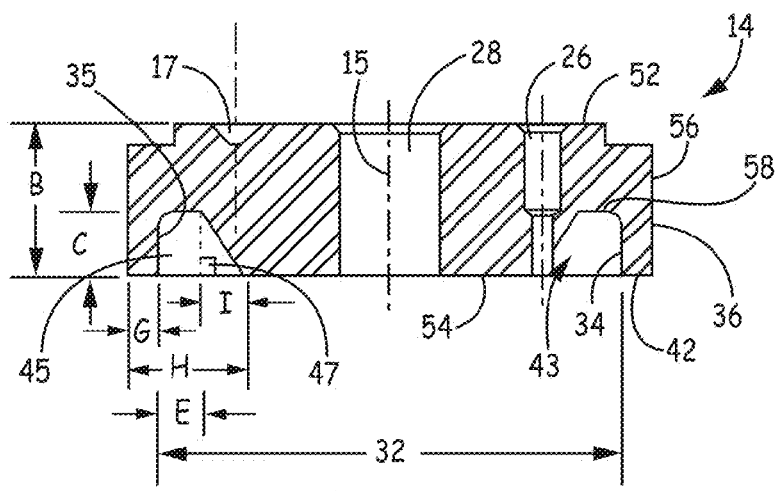
FIG. 2 is close-up section view of a battery cover.
Figure 3:
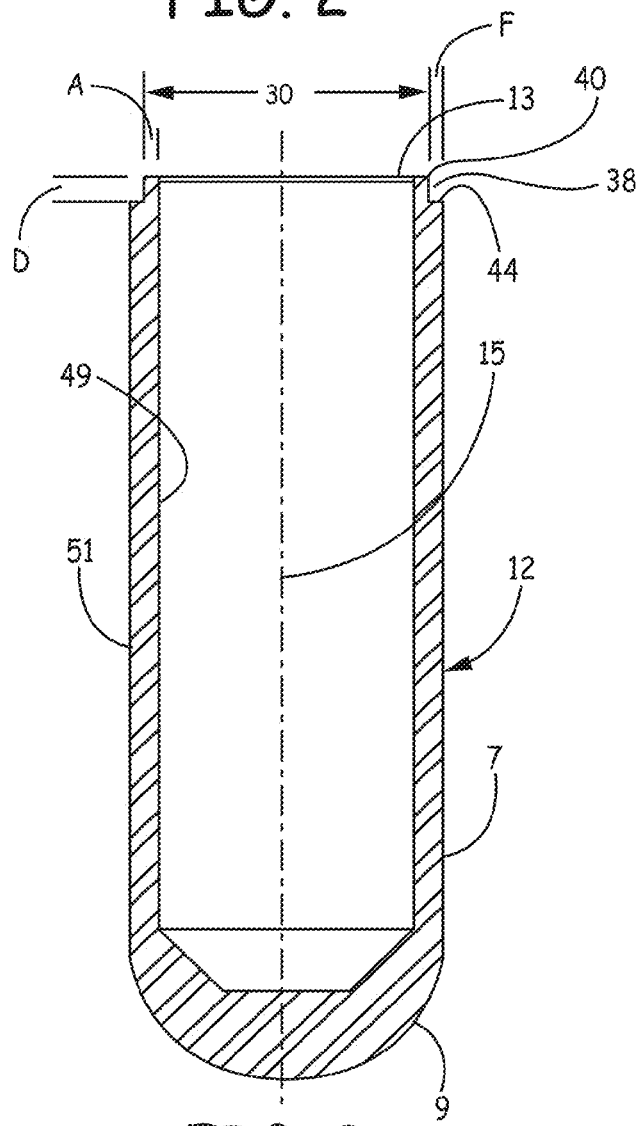
FIG. 3 is a close-up section view of a battery case.

FIGS. 2 and 3 depict battery cover 14 and battery case 12 in close-up. Battery cover 14 includes a fillport 26 for adding electrolyte and an opening 28 for the feedthrough pin 24. Battery case 12 has an open end 13 and a closed end 9 and a cylindrical or tubular portion 7. After electrolyte is added through the fillport, the fillport is sealed. Width 30 of the battery case 12 cooperates with internal width 32 of battery cover 32 to form a robust fit. When battery cover 14 is fitted onto the open end 13 of the battery case 12, battery cover 14 is welded to the open end 13 of the case 12. The battery cover and the battery case are centered about an axis 15.

Figure 8:
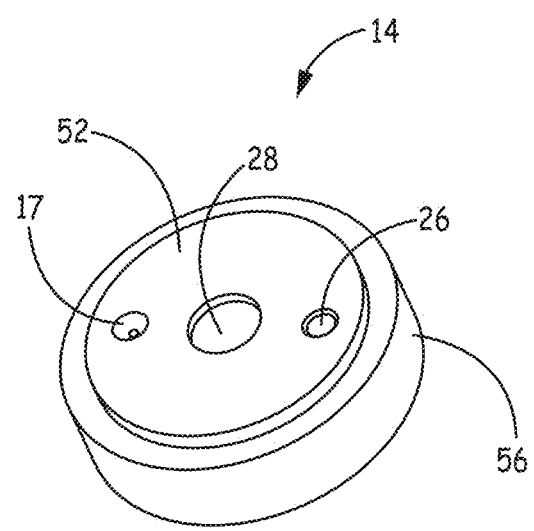
FIG. 8 is a close-up perspective view of a battery cover of the disclosure.
Figure 9:
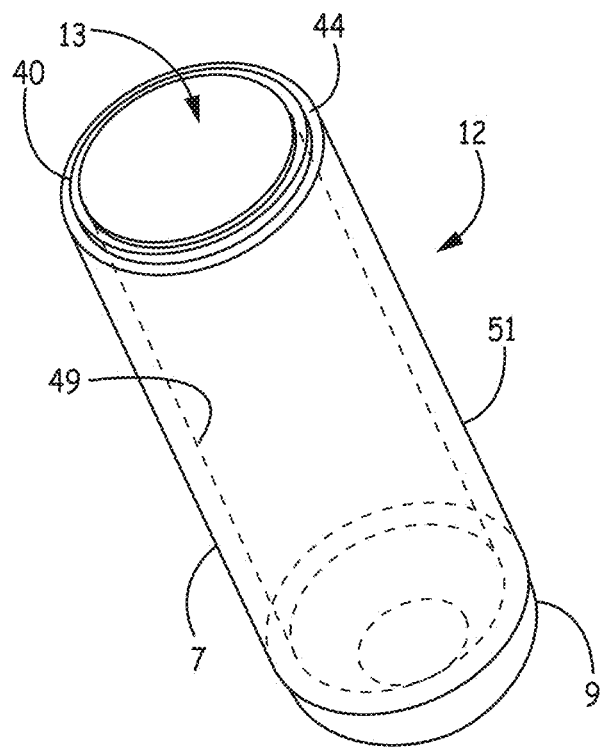
FIG. 9 is a close-up perspective view of a battery case of the disclosure.

FIGS. 8 and 9 depict the battery cover and case depicted in FIGS. 2 and 3 in perspective views.

In this embodiment, the battery cover 14 includes a divot or indentation 17 for identification of the exterior surface of the battery cover due to its relatively small size. For example, the outside diameter of the battery case and the battery cover can range from about 2 mm to about 7.5 mm and can be any diameter between about 2 mm and about 7.5 mm. The length of the battery assembly can range from about 8 mm to about 90 mm and can be any length between about 8 mm and about 90 mm.

When the battery cover 14 is mated to battery case 12, inside surface 34 of flange 36 abuts outside surface 38 of lip 40 and bottom surface 42 of flange 36 abuts ledge 44 of the battery case 12. Lip 40 fits or protrudes within the groove 43 in battery cover 14. Groove 43 has a substantially rectangular section 45 adjacent to a substantially triangular section 47 and within the groove. Lip 40 fits within substantially rectangular section 45 and may or may not extend to contact or abut the top surface 58 of groove. The outside surface 35 of groove 43 corresponds to the inside surface of flange 34. Substantially triangular section 47 has a shape substantially that of a right triangle, for example, a 30-60-90 right triangle.

In this embodiment, the width A of the lip 40 is a width that extends from the diameter of case inner surface 49 to a point between case outer surface diameter 51. Case outer surface diameter 51 is greater than case inner surface diameter and case inner surface diameter is less than case outer surface diameter. Ledge 44 has a width F that extends substantially horizontally from the outside surface 38 of lip 40 to the case outer surface diameter 51.

Battery cover 14 has a width B, top surface 52, bottom surface 54 and outside surface 56. Groove 43 has a depth C that substantially corresponds to the height D of the lip 40 of the case. The width A of the lip 40 substantially corresponds to the width E of the substantially rectangular section 45 of the groove. The overall width H of the groove 43 as measured at the bottom surface 58 of cover is the sum of width H of the substantially rectangular section 45 of groove and the width I of the base of the substantially triangular section 47. The width G of flange 36 substantially corresponds to the width F of ledge 44. The width G of flange 36 extends from the outside surface 56 of cover 14 to the inside surface of flange 34, which is also the outside surface 35 of groove 43.

In this embodiment, the lip, flange, ledge, bottom surface and groove are annular (see FIGS. 8 and 9). Of course, the shape of these elements, and others described in this application, are dependent upon the overall shape of the battery case and the battery cover.

The battery cover can be mated to the battery case by mating the lip 40 of the case within the groove 43 of the cover. When the cover and the case are mated together, the bottom surface of the flange abuts the surface of the ledge and forms a joint 60, referring to FIG. 1. The battery cover 14 may be welded to the battery case 12 at the joint by known means for example, laser welding, either continuous or pulse.

Applicants have discovered that the welding of the battery cap and battery case disclosed in this application provides a weld zone having lower stress than a known design, discussed in more detail below.

Figure 4:
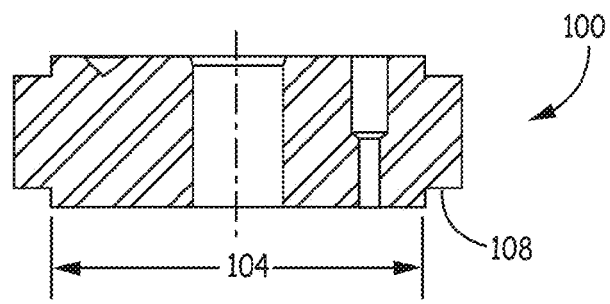
FIG. 4 is a close-up section view of a known battery cover.
Figure 5:
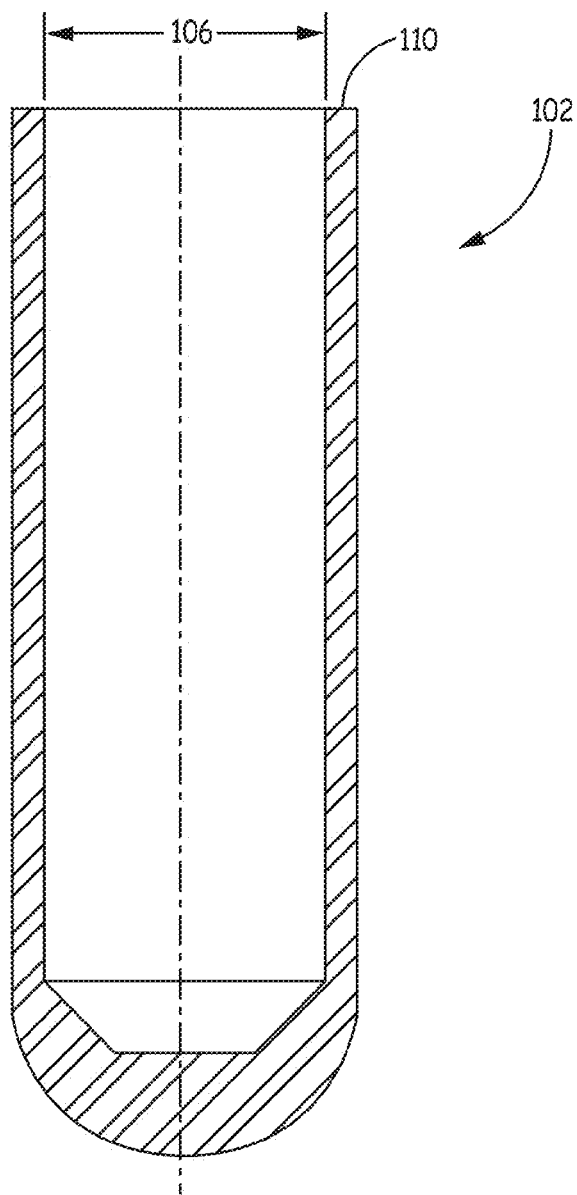
FIG. 5 is a close-up section view of a known battery case.

A known design for a substantially cylindrical battery case 100 and cover 102 is shown in FIGS. 4 and 5. In the design shown in FIGS. 4 and 5, cover portion width 104 is designed to cooperatively fit inside the internal case width 106. When fitted together, cover joint surface 108 and case joint surface 110 would abut and then be welded together at the seam formed by the two abutted surfaces. In this design, Applicants determined that high material stress was located within the weld zone. This phenomenon is shown in FIG. 6.

Figure 6:
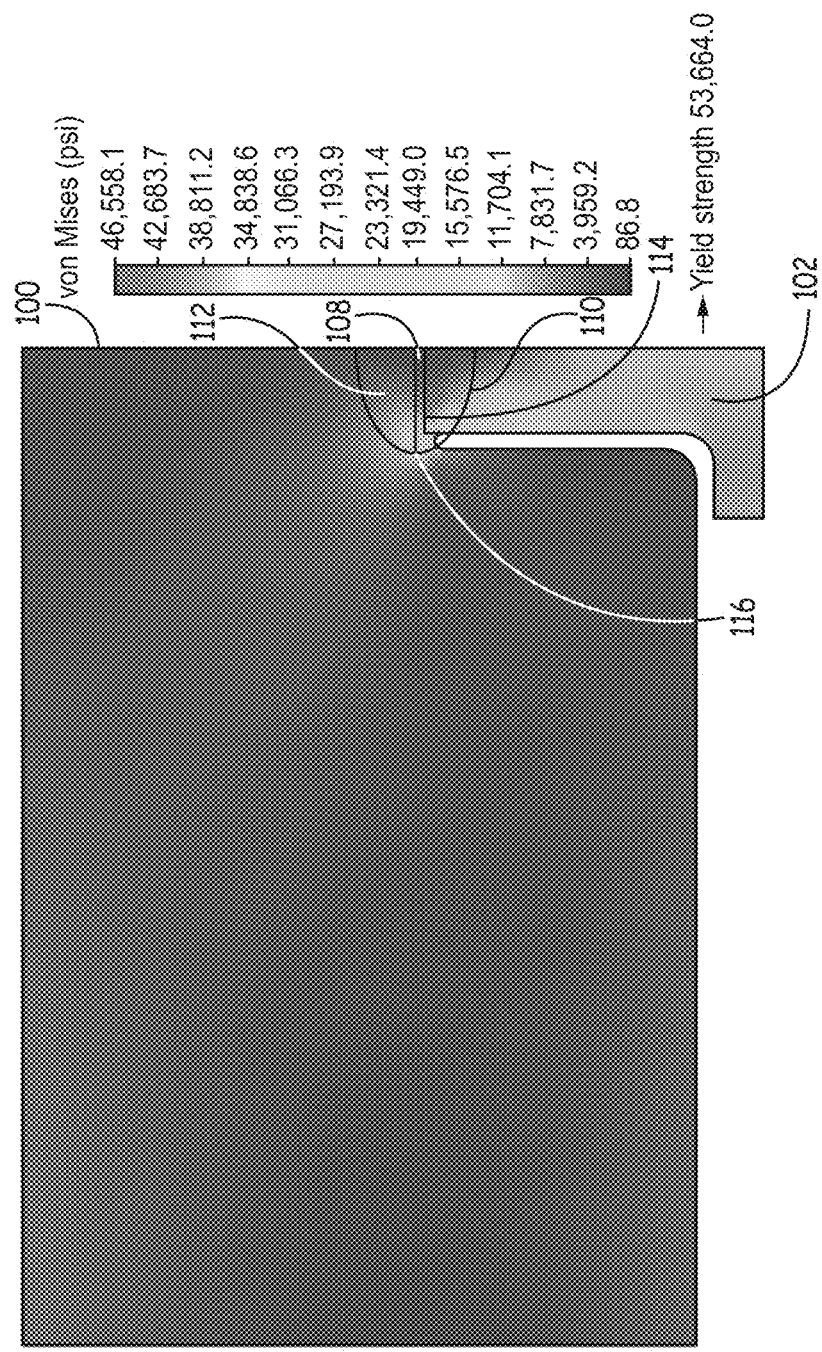
FIG. 6 is a depiction of the von Mises stress distribution in the proximity of the weld due to internal pressurization of a known design for an electrochemical cell case and cover.

FIG. 6 shows a depiction of cover 100 mated to case 102 of the known design depicted in FIGS. 4 and 5. Weld zone 112 is shown covering the resulting weld joint 114 and surrounding area within a radius. Through finite element analysis (FEA), the highest stress found in the known design was found in localized area 116 when the battery assembly is loaded with an internal pressure. This localized area 116 of stress lies within or overlaps in the weld zone 112.

Figure 7:
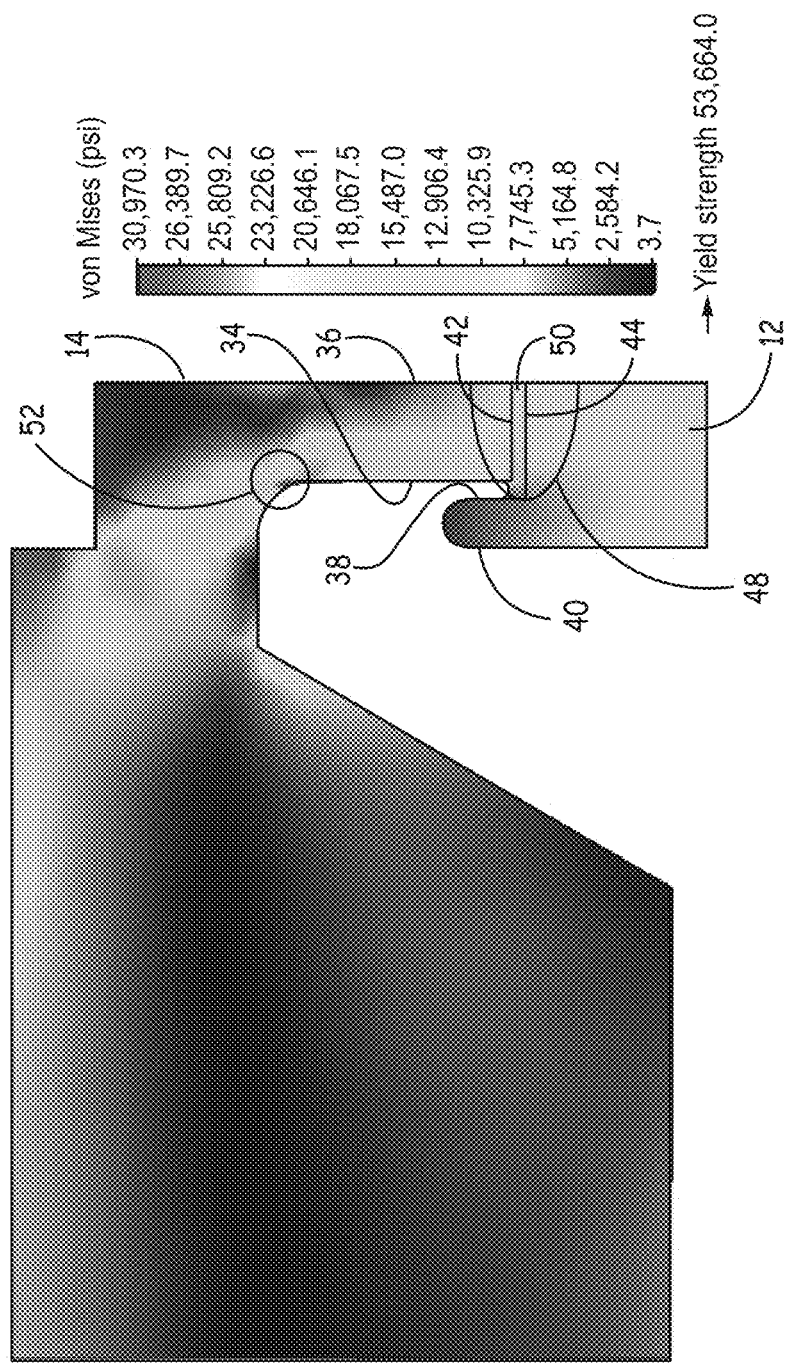
FIG. 7 is a depiction of the von Mises stress distribution in the proximity of the weld due to internal pressurization of a design for a battery case and cover of the disclosure.

FIG. 7 shows a depiction of battery cover 14 mated to battery case 12 of the design of the disclosure. Weld zone 48 is shown covering the resulting weld joint 50 and surrounding area within a radius. Through the same finite element analysis as described above, the highest stress found in the design disclosed in FIGS. 2 and 3 was found in localized area 52. As can be seen, localized area 52 is outside of the weld zone 48 and is located where the material is less susceptible to cracking. Another advantage of the disclosed design is that the maximum stress is reduced because of less stress concentration.

In one aspect the disclosure provides a method including forming a case for an electrochemical cell, the case including a case outer surface having a diameter or x or y dimension, a case inner surface having a diameter or x or y dimension less than the diameter or x or y dimension of the case outer surface, a closed end, and an open end, the open end of the case having a lip and a ledge, the lip having a height and a width, the width of the lip extending from the case inner surface to a point between the diameter or x or y dimension of the inner and outer case surfaces, the ledge having a surface extending from the lip to the case outer surface, and forming a cover for attaching to the open end of the case, the cover including a cover outer diameter or x or y dimension, a groove extending inwardly from a bottom surface of the cover, a flange having a bottom surface and the flange having a width extending from the outer surface of the cover to the outer surface of the groove, the groove having a substantially rectangular section and may have a substantially triangular section, the rectangular section having an opening for receiving the lip of the case and the bottom surface of the flange formed to abut the surface of the ledge.

In another aspect, the disclosure provides an apparatus including a case for an electrochemical cell, the case including a case outer surface having a diameter or an x or y dimension, a case inner surface having a diameter or x or y dimension less than the diameter of the case outer surface, a closed end, and an open end, the open end of the case having a lip and a ledge, the lip having a height and a width, the width of the lip extending from the case inner surface to a point between the diameter of the inner and outer case surfaces, the ledge having a surface extending from the lip to the case outer surface and a cover for attaching to the open end of the case, the cover including a cover outer diameter or x or y dimension, a groove extending inwardly from a bottom surface of the cover, a flange having a bottom surface and the flange having a width extending from the outer surface of the cover to the outer surface of the groove, the groove having a substantially rectangular section, the rectangular section having an opening for receiving the lip of the case and the bottom surface of the flange formed to abut the surface of the ledge.

It will be appreciated by persons skilled in the art that the present invention is not limited to what has been particularly shown and described herein above. In addition, unless mention was made above to the contrary, it should be noted that all of the accompanying drawings are not to scale. Of note, the system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Moreover, while certain embodiments or figures described herein may illustrate features not expressly indicated on other figures or embodiments, it is understood that the features and components of the system and devices disclosed herein are not necessarily exclusive of each other and may be included in a variety of different combinations or configurations without departing from the scope and spirit of the invention. A variety of modifications and variations are possible in light of the above teachings without departing from the scope and spirit of the invention, which is limited only by the following claims.

The invention claimed is:

1. A method comprising:
    forming a case for an electrochemical cell, the case including a case outer surface having a diameter, a case inner surface having a diameter less than the diameter of the case outer surface, a closed end, and an open end, the open end of the case having a lip and a ledge, the lip having a height and a width, the width of the lip extending from the case inner surface to a point between the diameter of the inner and outer case surfaces, the ledge having a surface extending from the lip to the case outer surface; and forming a cover for attaching to the open end of the case, the cover including a cover outer diameter, a groove having inner and outer groove surfaces extending inwardly from a bottom surface of the cover, a flange having a bottom surface and the flange having a width extending from the outer surface of the cover to the outer surface of the groove, the groove having a substantially rectangular section and a substantially triangular section adjacent to and in communication with the substantially rectangular section, the rectangular section having an opening for receiving the lip of the case and the bottom surface of the flange formed to abut the surface of the ledge.

2. The method of claim 1 further comprising mating the cover to the case by mating the lip of the case with the groove of the cover and the bottom surface of the flange with the surface of the ledge.

3. The method of claim 2 further comprising applying heat to an area encompassing the mated surfaces of the flange and the ledge to weld the cover and case together.

4. The method of claim 1 wherein the case contains any one of or any combination of an anode, a cathode, a separator, and an electrolyte.

5. The method of claim 3 wherein heat is applied by means of a laser.

6. An apparatus comprising:
a case for an electrochemical cell, the case including a case outer surface having a diameter, a case inner surface having a diameter less than the diameter of the case outer surface, a closed end, and an open end, the open end of the case having a lip and a ledge, the lip having a height and a width, the width of the lip extending from the case inner surface to a point between the diameter of the inner and outer case surfaces, the ledge having a surface extending from the lip to the case outer surface; and a cover for attaching to the open end of the case, the cover including a cover outer diameter, a groove having inner and outer groove surfaces extending inwardly from a bottom surface of the cover, a flange having a bottom surface and the flange having a width extending from the outer surface of the cover to the outer surface of the groove, the groove having a substantially rectangular section and a substantially triangular section adjacent to and in communication with the substantially rectangular section, the rectangular section having an opening for receiving the lip of the case and the bottom surface of the flange formed to abut the surface of the ledge.

7. The apparatus of claim 1 wherein the cover is mated to the case, the lip of the case within the groove of the cover and the bottom surface of the flange abutting the surface of the ledge, forming a joint.

8. The apparatus of claim 6 wherein the cover further comprises a feedthrough opening.

9. The apparatus of claim 6 wherein the cover further comprises a fillport.

* * * * *